(12) United States Patent
Nakagawa

(10) Patent No.: US 11,567,717 B2
(45) Date of Patent: Jan. 31, 2023

(54) INFORMATION PROCESSING APPARATUS AND INFORMATION PROCESSING METHOD FOR TRANSMITTING INFORMATION ABOUT PRINT JOB

(71) Applicant: CANON KABUSHIKI KAISHA, Tokyo (JP)

(72) Inventor: Masashi Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/520,494

(22) Filed: Nov. 5, 2021

(65) Prior Publication Data
US 2022/0147286 A1    May 12, 2022

(30) Foreign Application Priority Data
Nov. 11, 2020    (JP) .............................. JP2020-188195

(51) Int. Cl.
*G06F 3/12*    (2006.01)
(52) U.S. Cl.
CPC ............ *G06F 3/126* (2013.01); *G06F 3/1205* (2013.01); *G06F 3/1231* (2013.01); *G06F 3/1253* (2013.01); *G06F 3/1268* (2013.01); *G06F 3/1276* (2013.01); *G06F 3/1285* (2013.01)

(58) Field of Classification Search
CPC ...... G06F 3/126; G06F 3/1205; G06F 3/1231; G06F 3/1253; G06F 3/1268; G06F 3/1276; G06F 3/1285
See application file for complete search history.

(56) References Cited

U.S. PATENT DOCUMENTS

| | | | |
|---|---|---|---|
| 2013/0188221 A1* | 7/2013 | Ohno | G06F 3/1296 358/1.15 |
| 2014/0067456 A1* | 3/2014 | Kashida | G06Q 10/06315 705/7.25 |
| 2020/0104657 A1* | 4/2020 | Sato | G06K 15/1806 |
| 2021/0011672 A1* | 1/2021 | Ohashi | G06F 3/1241 |

\* cited by examiner

*Primary Examiner* — Iriana Cruz
(74) *Attorney, Agent, or Firm* — Canon U.S.A., Inc. IP Division

(57) ABSTRACT

An information processing apparatus according to an aspect of the present disclosure acquires information about a print job generated in a predetermined print queue by a printer driver, and transmits the acquired information about the print job to an external service to aggregate information about print jobs.

19 Claims, 12 Drawing Sheets

INFORMATION PROCESSING APPARATUS AND INFORMATION PROCESSING METHOD FOR TRANSMITTING INFORMATION ABOUT PRINT JOB

BACKGROUND

Field

The present disclosure relates to a technique of transmitting information about a predetermined print job (e.g., information about printing performed for work during teleworking) to an external service.

Description of the Related Art

In a case where a user prints a document when the user teleworks, the user can carry out printing using a printer owned by the user. In a case where printing is performed for the purpose of use for work as in this case, the employer of the user should bear the expense for the printing. Further, in a case where a user prints a document using a printer lent by the employer of the user, it is desirable to determine whether this printing is for work (public use) or for private use.

US2014/0067456 discusses a technique of displaying a button for a user to select either printing for private use or printing for public use, in a print setting screen for setting information such as paper size, color/monochrome, and print side. Further, in a case where the printing for public use is performed using a lent printer, a use amount log for the calculation of printing cost and a content log indicating a print image are transmitted to a log collecting apparatus at the workplace, and in a case where the printing for private use is performed, only a use amount log is transmitted to the log collecting apparatus. The user is thereby reimbursed for the printing cost incurred in the printing for public use, distinguished from the printing for private use. US2014/0067456 also discusses the following as another example. In a case where a printer owned by the user is used, the user transmits a use amount log and a content log to the log collecting apparatus at the workplace only when performing the printing for public use, so that the user can be reimbursed for the cost of printing performed for work.

In the technique discussed in US2014/0067456, however, it is desirable to provide a printer driver configured to display the button for the user to select either the printing for private use or the printing for public use in the print setting screen for setting the information such as paper size, color/monochrome, and print side.

SUMMARY

According to an aspect of the present invention, an information processing apparatus includes at least one memory that stores instructions, and at least one processor that executes the instructions to perform acquiring information about a print job generated in a predetermined print queue by a printer driver, and transmitting the acquired information about the print job to an external service to aggregate information about print jobs.

Further features of the present disclosure will become apparent from the following description of exemplary embodiments with reference to the attached drawings.

DESCRIPTION OF THE EMBODIMENTS

Figure 1:
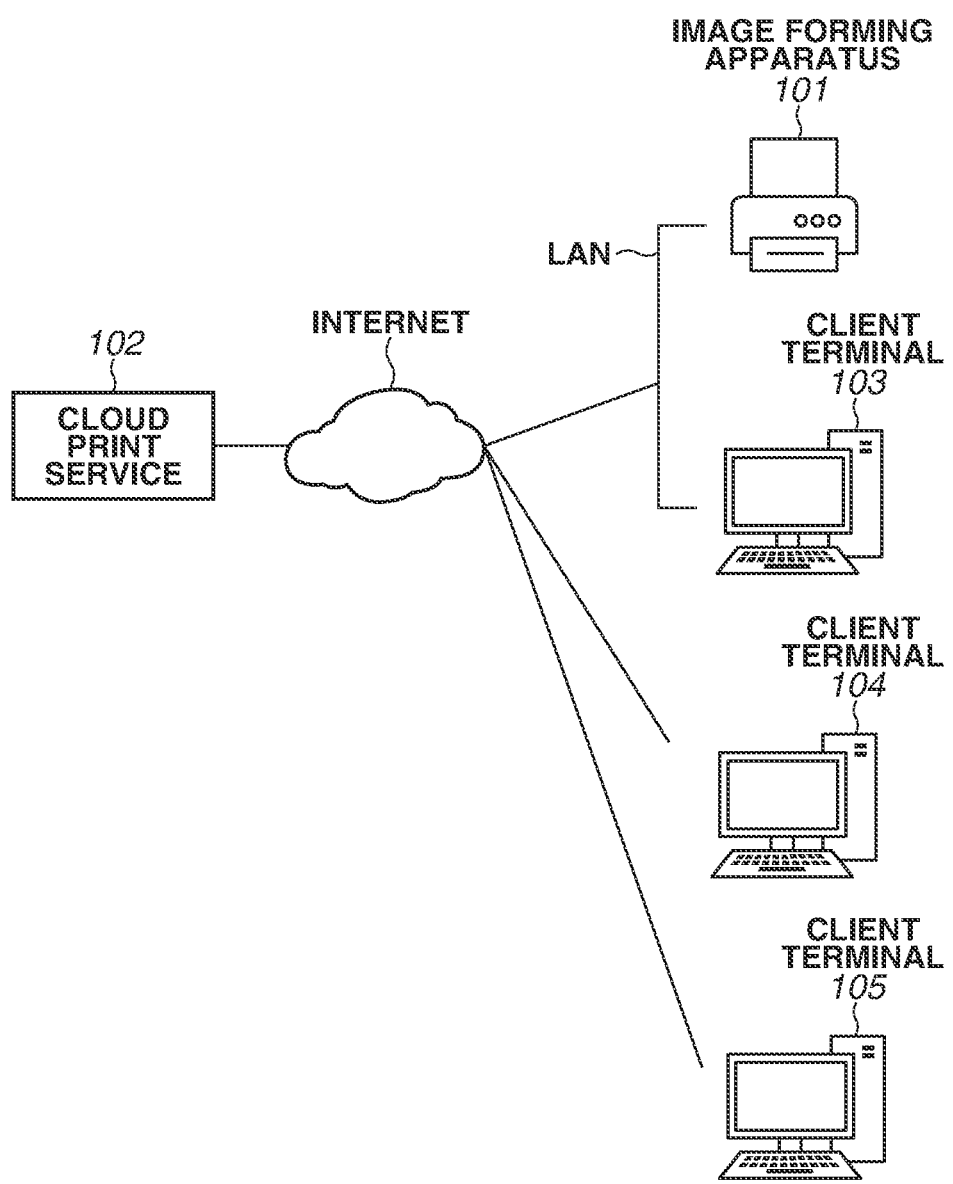
FIG. 1 is a diagram illustrating a system configuration according to an exemplary embodiment.

FIG. 1 is a block diagram illustrating a system configuration in an exemplary embodiment. Client terminals 103 to 105 are connected to a cloud print service (hereinafter referred to as "CPS") 102 via a network (the Internet, or a local area network (LAN)). The CPS 102 is a cloud print service provided by cloud computing. The CPS 102 controls print jobs and provides processing such as aggregation/reimbursement processing for information (such as the number of printed sheets for work) about print jobs. The client terminal 103 can communicate with an image forming apparatus (a printer or a multifunction peripheral) 101 via a LAN or a Universal Serial Bus (USB) cable, and can issue a print instruction based on an operation by a user. The client terminal 103 can transmit a print job to the image forming apparatus 101 via the LAN or USB cable to issue a print instruction, and can also transmit a print job to the image forming apparatus 101 via the CPS 102. The client terminals 104 and 105 each used by another user or an administrator of the CPS 102 are also connected to the CPS 102 via a network. The image forming apparatus 101 receives the print job transmitted from the client terminal 103 directly or via the CPS 102, and executes print processing based on the received print job. In the present exemplary embodiment, the image forming apparatus 101 is a printer or multifunction peripheral for personal use at the home of the user, but is not limited thereto. Further, in the present exemplary embodiment, the CPS 102 is provided by the cloud computing, but is limited thereto, and may be a server apparatus (an external apparatus different from the client terminals) that provides a service such as aggregation of information about print jobs.

Figure 2:
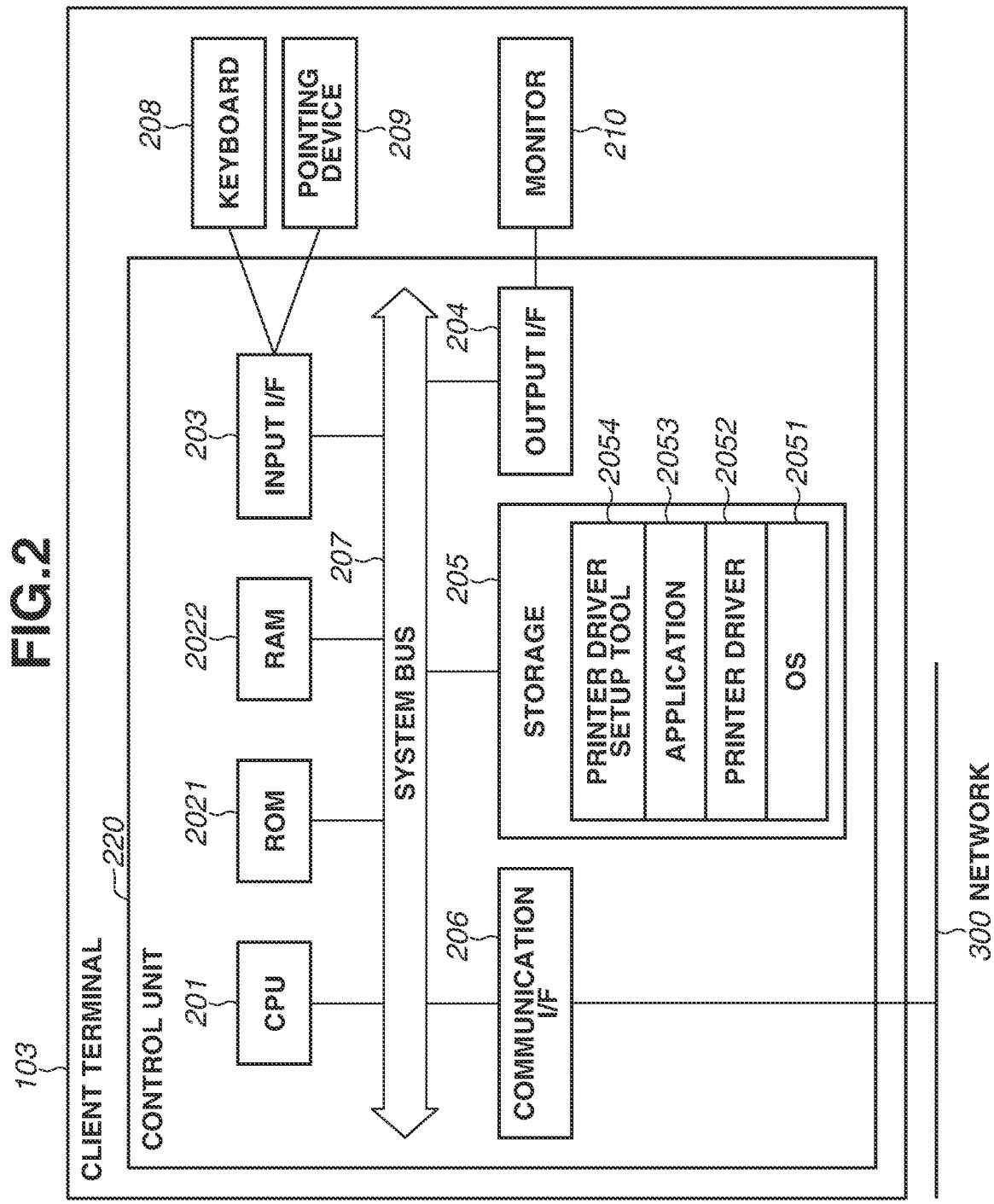
FIG. 2 illustrates a system configuration example of a client terminal according to the exemplary embodiment.

FIG. 2 illustrates a system configuration example of the client terminal 103 (an information processing apparatus) in the present exemplary embodiment. The client terminals 104 and 105 each also have a configuration similar to this configuration. A central processing unit (CPU) 201 of the client terminal 103 directly or indirectly controls each device connected by a system bus 207, and executes a program for implementing the present exemplary embodiment. A read only memory (ROM) 2021 stores a basic input/output system (BIOS). A random access memory (RAM) 2022 is used as a work area of the CPU 201, and used as a primary storage for loading the program for implementing the present exemplary embodiment. A storage 205 stores an operating system (OS) 2051 serving as the basic software of the client terminal 103, a printer driver 2052, and an application 2053. A print application 301 and a print report management application 310 to be described below belong to the application 2053 in terms of software configuration. A printer driver setup tool 2054 also belongs to the application 2053 in terms of software configuration, but is illustrated separately for convenience of description. Specific examples of the storage 205 include a hard disk drive (HDD) and a solid state drive (SSD), but the storage 205 is not limited thereto. An output interface (I/F) 204 is an interface for connection to a monitor 210 and the like. An input I/F 203 is an interface for connection to a keyboard 208, a pointing device 209 such as a mouse, and the like. A communication I/F 206 is an interface for connection to a network 300 such as a LAN or the Internet.

Typically, when the user of the client terminal 103 designates the image forming apparatus 101 that the user wants to use, and provides an instruction to add the designated image forming apparatus 101 to a print system of the OS 2051, a printer driver for the image forming apparatus 101 is installed on the client terminal 103, and a logical printer (a print queue) corresponding to the image forming apparatus 101 is additionally registered in the print system of the OS 2051. The logical printer (the print queue) is registered in association with information such as the printer driver to be used, a port name to be used in transmitting data to the image forming apparatus 101, and the model name of the image forming apparatus 101. In printing performed from a general print application, when a user selects a desired printer from one or more logical printers (print queues) registered in a print system and provides a print instruction, a print job is transmitted to an image forming apparatus associated with the selected logical printer, and printing is performed.

However, it is difficult to distinguish between printing for private use and printing for work, by merely adding the logical printer (the print queue) of the image forming apparatus 101 to be used at the home to the print system of the client terminal 103. Therefore, in the present exemplary embodiment, as will be described below, the printer driver setup tool 2054 is executed, so that a logical printer (a print queue) for work is additionally registered using information of a logical printer (a print queue) registered in the print system. For the logical printer for work to be additionally registered, a printer driver and a port name to be used are created by duplicating those of the registered logical printer, but a new printer name to be easily identified as being for work is given. Further, in a case where this logical printer for work is selected and a print instruction is provided, the print report management application 310 transmits information about a print job subjected to the print processing to the CPS 102 as a print report. The CPS 102 saves the received print report (the information about the print job subjected to the print processing for work), and performs processing such as aggregation processing and reimbursement processing.

Figure 3:
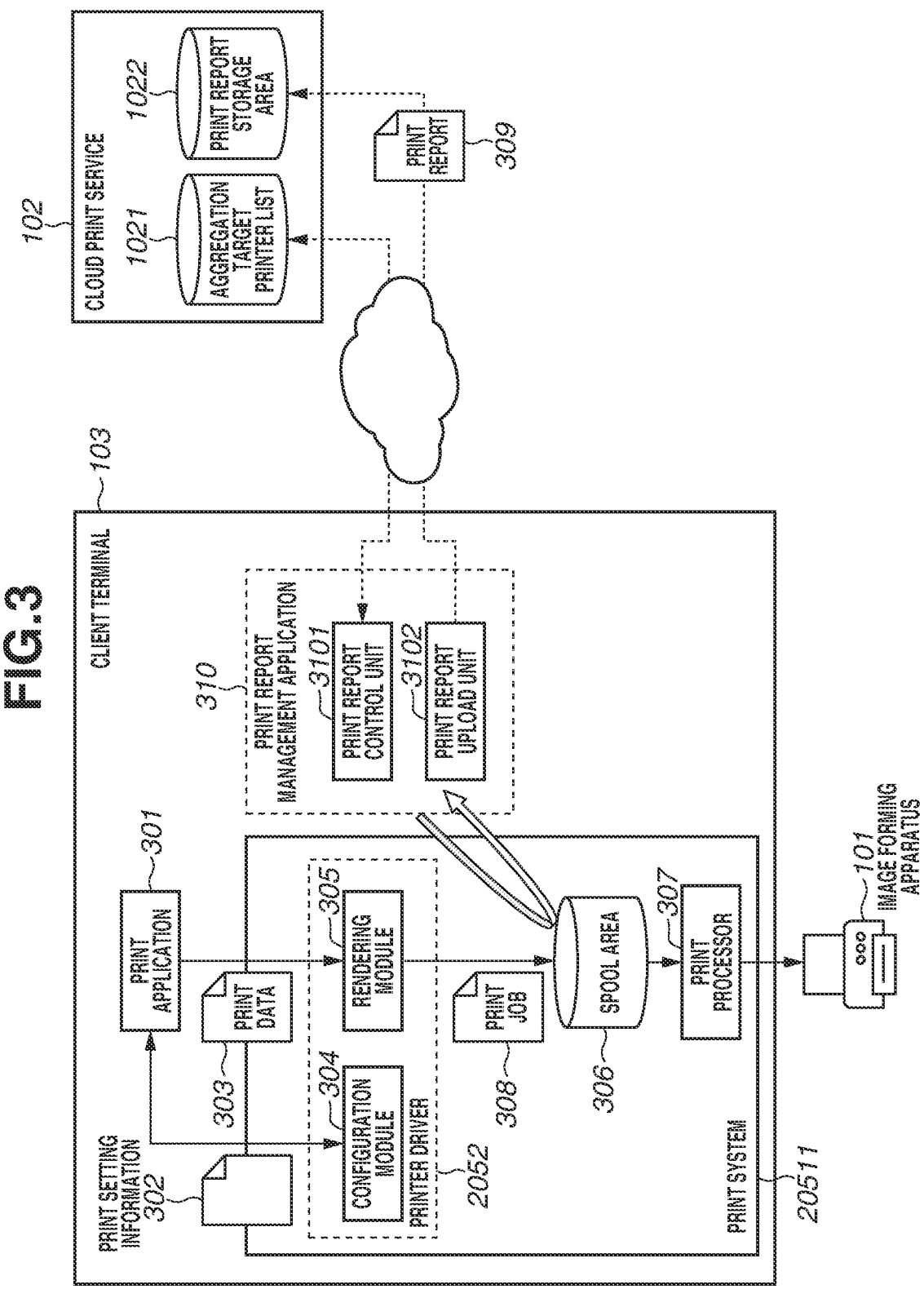
FIG. 3 illustrates a software configuration example according to the exemplary embodiment.

FIG. 3 is a diagram illustrating a software configuration example in the present exemplary embodiment. The client terminal 103 includes the print application 301, a print system 20511 provided by the OS 2051, the printer driver 2052 that operates in conjunction with the print system 20511, and the print report management application (hereinafter referred to as the print report management app) 310.

Further, the print report management app 310 can communicate with the CPS 102 via the network. The print application 301, the print system 20511, and the print report management app 310 operate on the OS 2051. The print application 301 is a general application that can issue a print instruction, and examples of the print application 301 include a document creation application, a spreadsheet application, and a web browser.

The print system 20511 includes a spool area 306 and a print processor 307. The printer driver 2052 receives print data 303 from the print application 301 and generates a print job 308, using Graphics Device Interface (GDI), Extensible Markup Language (XML) Paper Specification (XPS), or the like. The printer driver 2052 includes a configuration module 304 and a rendering module 305. The configuration module 304 mainly has a function of editing print setting information 302. The print setting information 302 is auxiliary information to be used in generating the print job 308 from the print data 303, and includes information such as a two-sided print setting, a color print setting, a paper size setting, a print target page setting, and a copy number setting. The print setting information 302 can further include information about a user who has provided a print instruction and information such as the time of printing. The printer driver 2052 further has a function of providing information such as information about a function of the image forming apparatus 101, to be used for setting the print setting information 302 in the print application 301, via the print system 20511. After making the print settings in the print setting screen is completed, the print application 301 transmits the print data 303 to the rendering module 305 of the printer driver 2052, via the print system 20511. The rendering module 305 converts the received print data 303 into the print job 308 in a format (a page description language (PDL)) that can be interpreted by the image forming apparatus 101. The format of the print job 308 is not limited to the PDL and may be any format if the format can be interpreted by the image forming apparatus 101. The printer driver 2052 further has a function of reflecting the print setting information 302 set by the configuration module 304 in the print job 308, when converting the print data 303. For example, in a case where printing for two pages laid out in one sheet, so-called layout printing, is set, an image of each page of the print data 303 is reduced so that an actual image is about half in size, and data for two pages is placed in one sheet. The rendering module 305 transmits the print job 308 after the conversion to the spool area 306. The print job 308 is temporarily stored in the spool area 306, because, if the print job 308 is directly transmitted to the image forming apparatus 101, the image forming apparatus 101 can be unable to finish processing, and the print job 308 can be thereby lost depending on the situation. Therefore, the print job 308 is temporarily stored in the spool area 306, and transmitted when the image forming apparatus 101 can process the print job 308. When the print system 20511 determines that the image forming apparatus 101 can process the next data, the print job 308 stored in the spool area 306 is transmitted to the print processor 307. The print processor 307 manages mainly the entire print job 308. The print processor 307 may have a watermark function of additionally rendering "Confidential", "Copy Prohibited", or the like in the print page, and a function of calculating the total number of print pages of the print job 308.

The print report management app 310 is an application that monitors the print job 308 generated by the printer driver 2052, and registers information indicating what type of printing has been performed, in the CPS 102, as a print report 309. The print report management app 310 includes a print report control unit 3101 and a print report upload unit 3102. The print report control unit 3101 determines whether a logical printer (a print queue) corresponding to a generated print job is a print report target (an aggregation target), and, if the print report control unit 3101 determines that the logical printer is the report target, the print report control unit 3101 creates the print report 309 based on information about the print job. Subsequently, the print report upload unit 3102 uploads the print report 309 created by the print report control unit 3101 to the CPS 102. The print report 309 includes information such as the number of pages in two-sided/one-sided printing, the number of pages in color/monochrome printing, the total number of printed sheets, the name of the print job, and the name of a user who has carried out the printing. Each time the printing is performed or at predetermined timing (e.g., regularly), the print report 309 is uploaded to the CPS 102. The print report management app 310 of the present exemplary embodiment stays upon the activation of the client terminal 103, and determines which logical printer (print queue) has processed a print job, by regularly referring to the spool area 306 of the print system 20511. However, the present exemplary embodiment is not limited to the configuration in which the print report management app 310 thus regularly refers to the spool area 306. In other words, if the print report management app 310 can detect in which print queue a print job is processed, any technique can be used. For example, there may be adopted such a mechanism that, when the print job 308 is generated by the printer driver 2052, the print system 20511 notifies the print report management app 310 of this generation. Further, there may be adopted such a mechanism that, when the print processor 307 has transmitted the print job 308 to the image forming apparatus 101, the print report management app 310 is notified of this transmission, in cooperation with the print processor 307.

Figure 4:
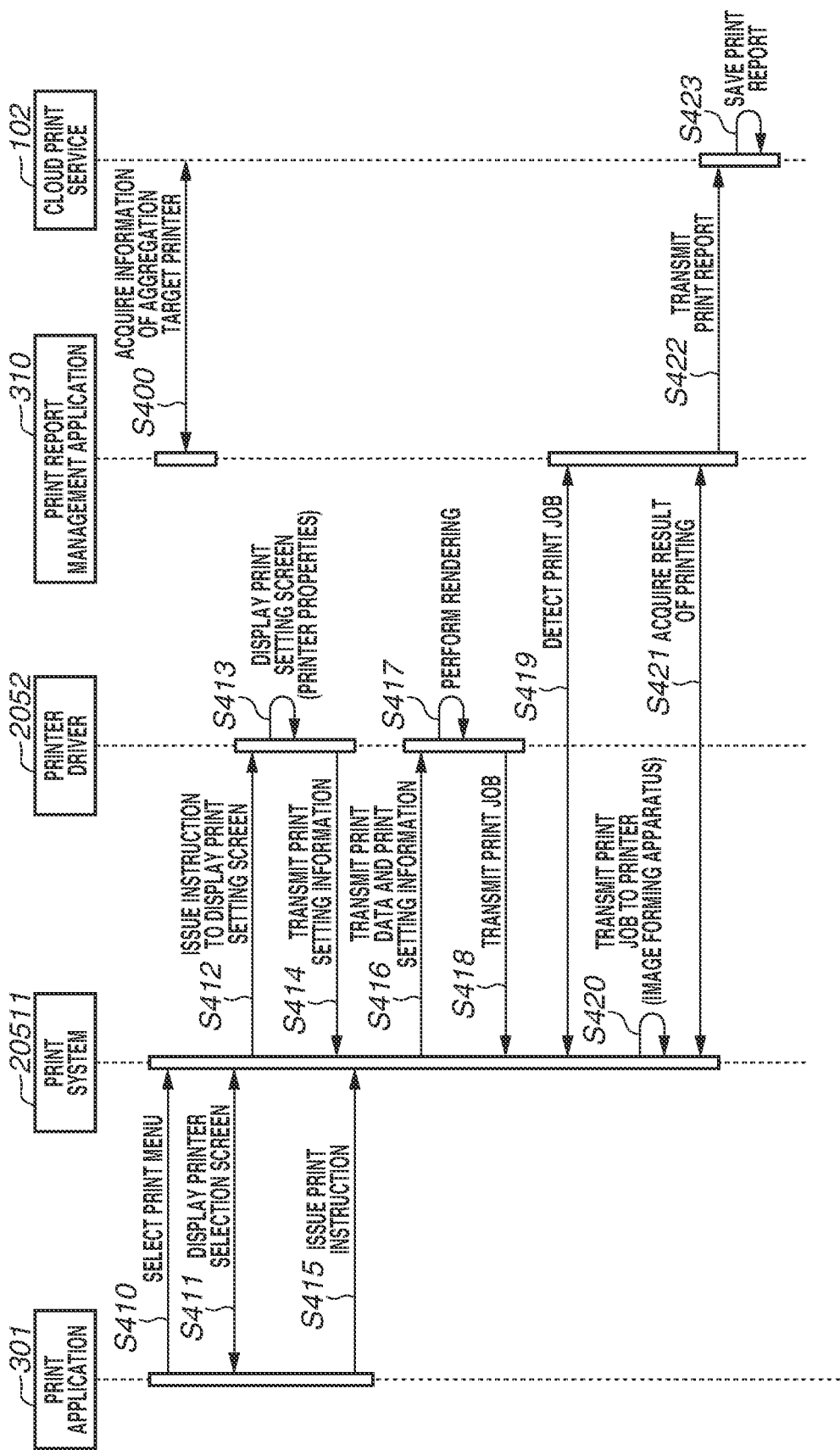
FIG. 4 is a diagram illustrating a sequence of print processing in the present exemplary embodiment.

A sequence of print processing in the present exemplary embodiment will be described with reference to FIG. 4. In step S400, the print report management app 310 regularly refers to the CPS 102 for information (such as a printer name) of a logical printer for work to be an aggregation target (a transmission target for a print report) and acquires the information. The logical printer for work to be the aggregation target is designated beforehand by the administrator of the CPS 102, and information (such as a printer name) of this designated logical printer is acquired. The timing to acquire this information is not limited to this example. For example, as will be described below, the print report management app 310 may refer to the CPS 102 for the latest information of the aggregation target printer and acquire the information, when the print report management app 310 detects registration of a print job in a print queue after the print job is generated by the printer driver 2052.

Figure 11:
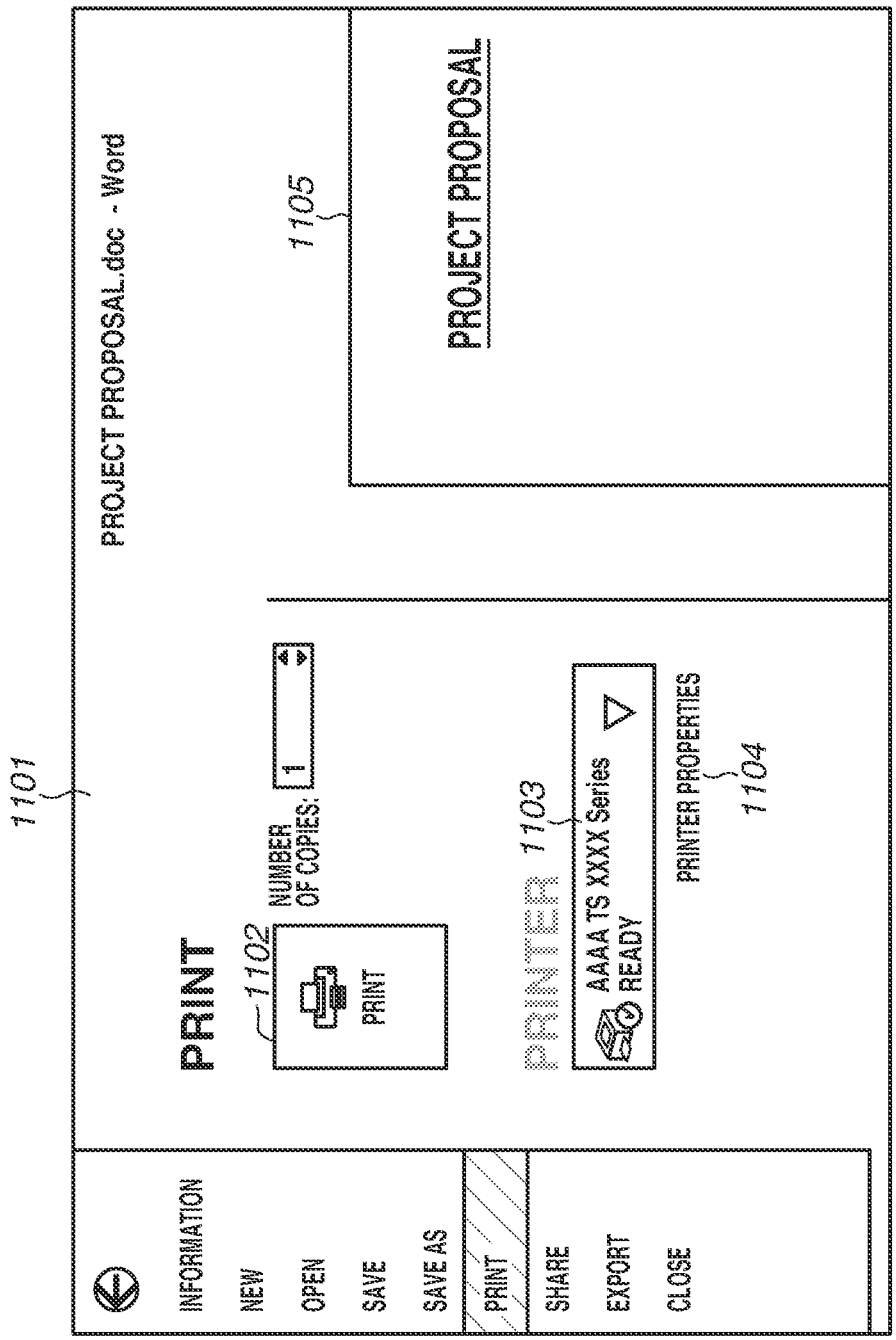
FIG. 11 illustrates an example of a printer selection screen.
Figure 12:
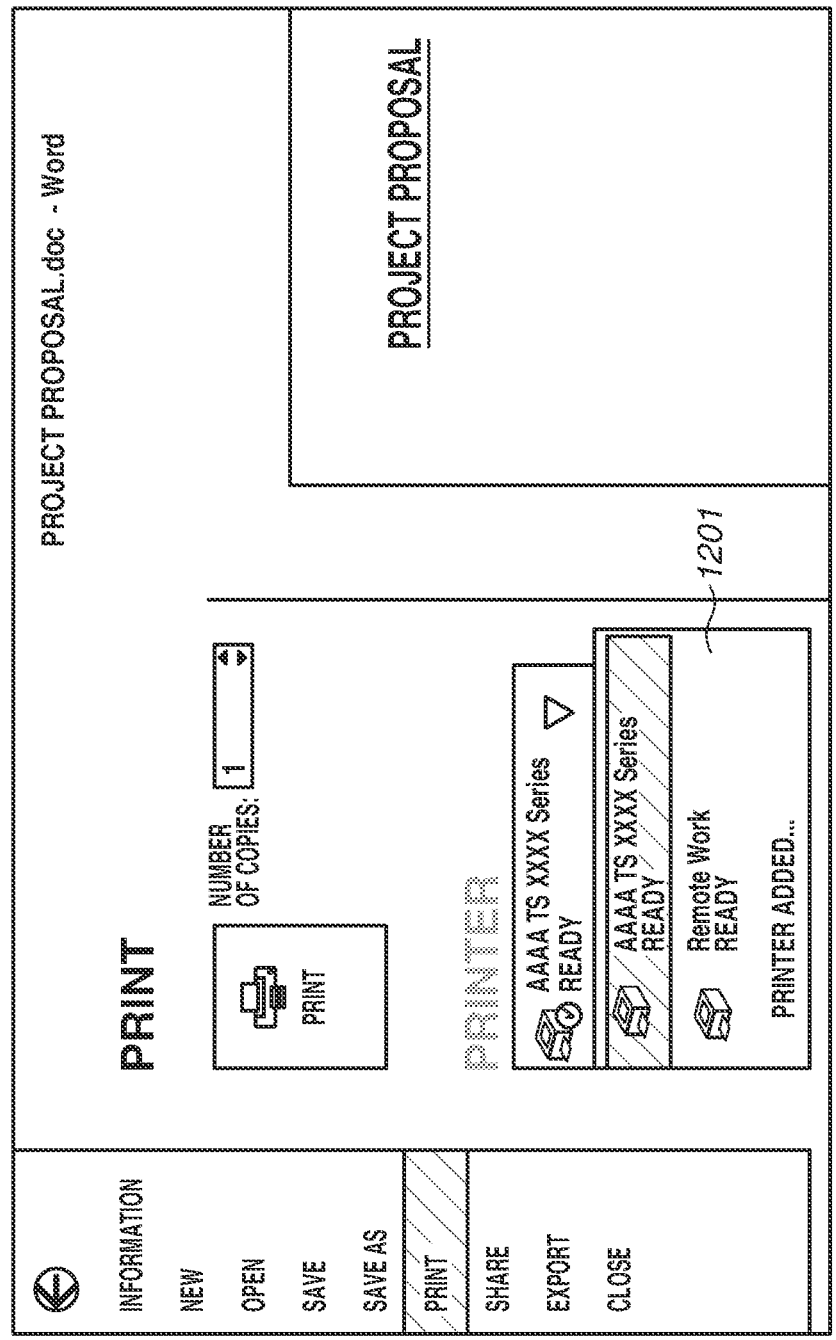
FIG. 12 illustrates an example of a case where a printer list is displayed in the printer selection screen.

Next, in step S410, the user selects a print menu based on a user operation. In step S411, the print application 301 refers to the print system 20511 for information of a registered logical printer, and displays a printer selection screen for prompting the user to select a printer as a print output destination. FIG. 11 illustrates a printer selection screen 1101 as an example of the displayed printer selection screen. The printer selection screen 1101 includes a drop-down list 1103 for selecting a logical printer as an output destination based on a user operation, a selection menu 1104 for further displaying a print setting screen (not illustrated) for making detailed print settings about the logical printer currently selected in the drop-down list 1103, a preview 1105 of a document that is a print target, and a button 1102 for starting the print processing. When the user selects the drop-down list 1103, a list 1201 of printers (logical printers) registered in the client terminal 103 appears in a drop-down manner as illustrated in FIG. 12. Subsequently, in a case where the user provides a print instruction after selecting a logical printer for work (e.g., a printer named "Remote Work") from the list 1201, the CPS 102 is notified of information about the print job of the instruction as a print report, as will be described below. On the other hand, in a case where printing is performed after a logical printer (e.g., a printer named "AAAA TS XXXX Series") for a purpose other than work is selected by the user in the drop-down list 1103, no information is notified as a print report to the CPS 102. Therefore, the user can select whether to automatically transmit a print report, only by selecting a corresponding logical printer from the drop-down list 1103, depending whether printing is for work or for the other purpose. In the present exemplary embodiment, the print application 301 is described to display the printer selection screen, but the present exemplary embodiment is not limited thereto, and the print system 20511 may display the printer selection screen.

In step S412, in a case where the selection menu 1104 for displaying printer properties is designated by the user in the printer selection screen 1101 in FIG. 11, the print system 20511 instructs the corresponding printer driver 2052 to display the print setting screen. Subsequently, in step S413, the configuration module 304 of the printer driver 2052 displays the print setting screen. The print setting screen (a printer property screen) is a screen for making detailed print settings such as a two-sided print setting and a color print setting. In step S414, when completion of change of the print settings is designated by the user in the print setting screen, the print setting information 302 after the change is transmitted to the print system 20511.

In step S415, when the button 1102 for starting the print processing is selected by the user in the printer selection screen 1101 in FIG. 11, the print application 301 instructs the print system 20511 to start the print processing. In step S416, upon being instructed to start the print processing, the print system 20511 transmits the print data 303 and the print setting information 302 to the printer driver 2052 and issues a rendering start instruction. Subsequently, in step S417, the rendering module 305 of the printer driver 2052 performs conversion processing (rendering processing) for the print data 303 and generates the print job 308. In step S418, the printer driver 2052 transmits the generated print job 308 to the print system 20511 and registers the print job 308 in the print queue of the selected logical printer.

In step S419, the print report management app 310 detects whether a print job is registered in the print queue of the logical printer of the aggregation target (the report target). The print report management app 310 may detect whether a print job is registered in the print queue of the logical printer of the aggregation target, by regularly monitoring the spool area 306. Alternatively, the print report management app 310 may provide a callback function to the print system 20511 beforehand, and the print system 20511 may call the callback function and notify the print report management app 310 when the print job 308 is registered in the print queue.

In step S420, the print system 20511 of the client terminal 103 transmits the print job 308 to the image forming apparatus 101. In step S421, upon completion of the print processing, the print report management app 310 acquires the result of the print processing. In step S422, in a case where the print report management app 310 has acquired the result of processing the print job in the print queue of the logical printer of the aggregation target, the print report management app 310 notifies the CPS 102 of information about the print job as the print report 309. In step S423, upon receiving the print report 309, the CPS 102 saves the print report 309 in a print report storage area 1022. In this way, in a case where the logical printer for work is selected by the user and the print processing is performed, the print report is notified to the CPS 102, and therefore, the CPS 102 can reimburse the expense of the printing for work based on this print report.

Figure 5:
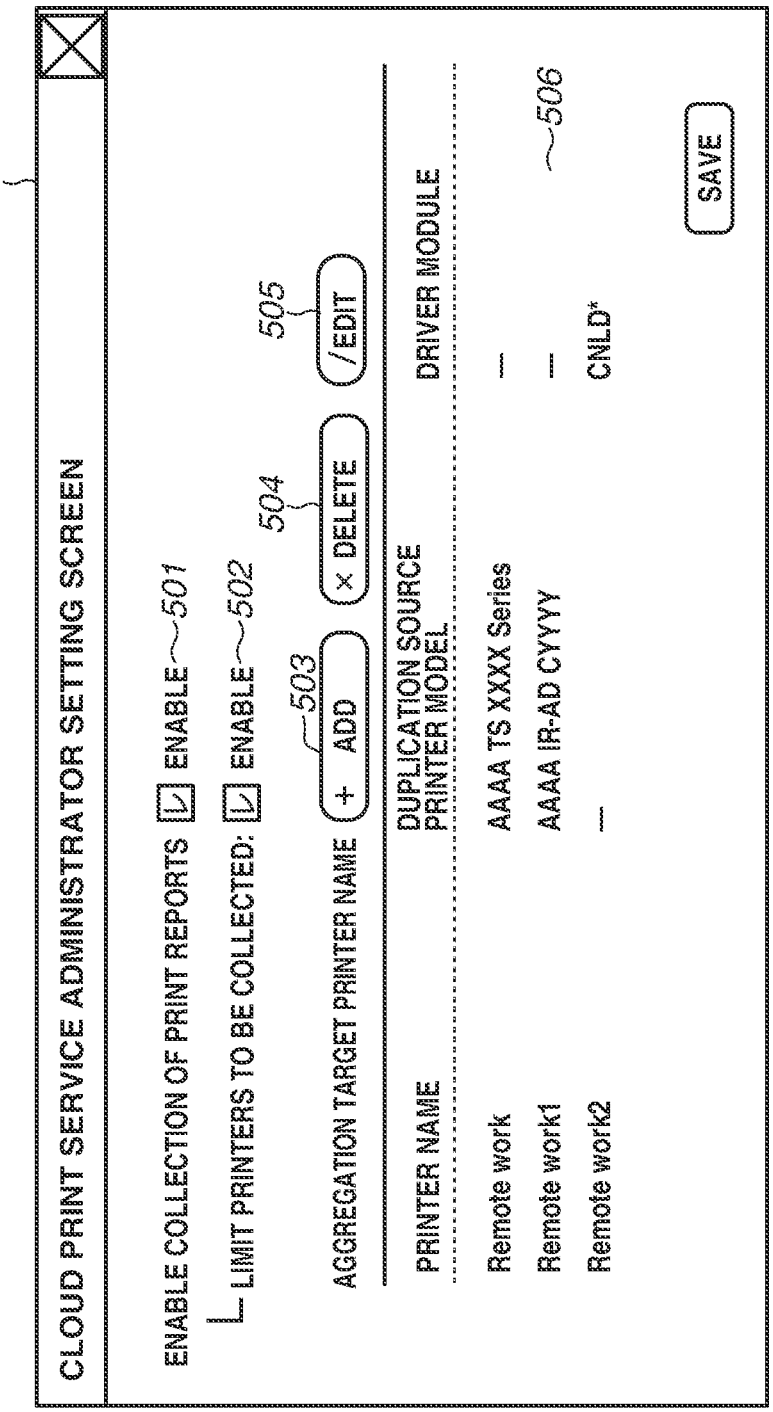
FIG. 5 illustrates an example of a cloud print service administrator setting screen in the present exemplary embodiment.

Next, processing in creating a logical printer (a print queue) to be an aggregation target in the client terminal 103 will be described. In the present exemplary embodiment, the administrator of the CPS 102 designates beforehand information such as the printer name and the printer model of a printer to be an aggregation target, and a procedure of setting such information will be described with reference to FIG. 5 and FIG. 6. FIG. 5 illustrates a cloud print service administrator setting screen 500 that can be operated by the administrator of the CPS 102. The cloud print service administrator setting screen 500 can be accessed using a web service, from a web browser of a client terminal used by the administrator of the CPS 102, but is not limited thereto. The cloud print service administrator setting screen 500 includes a check box 501 to "enable collection of print reports", a check box 502 to "limit printers to be collected", and a list 506 of aggregation target printer names. Further, addition, deletion, and editing of the aggregation target printers in the list 506 of the aggregation target printer names can be performed by operating an add button 503, a delete button 504, and an edit button 505. The administrator of the CPS 102 can manage the printer for the print report 309, by enabling/disabling the check boxes 501 and 502, and adding/deleting the aggregation target printer.

Figure 6:
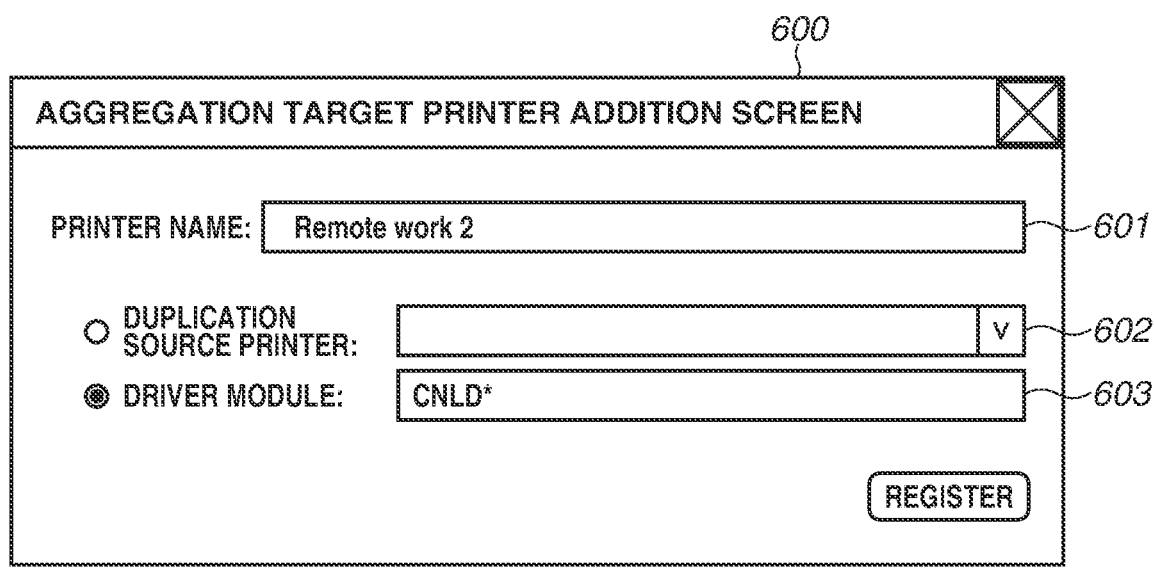
FIG. 6 illustrates an example of a screen for additionally registering an aggregation target printer in the present exemplary embodiment.

FIG. 6 is a diagram illustrating a screen for additionally registering information of an aggregation target printer, and this screen is displayed in a case where the add button 503 in FIG. 5 is pressed. An aggregation target printer addition screen 600 includes a control 601 for inputting "printer name of aggregation target", a drop-down list 602 for designating "duplication source printer model", and a control 603 for inputting "driver module name". Either the drop-down list 602 for designating "duplication source printer model" or the control 603 for inputting "driver module name" can be selected using the corresponding one of radio buttons. In the control 601 for inputting "printer name of aggregation target", an aggregation target printer name to be actually used in creating a logical printer in the client terminal 103 is input. In the drop-down list 602 for designating "duplication source printer model", the model or product name of a printer driver to be a duplication source in creating the logical printer of the aggregation target is selected. Therefore, when the printer driver setup tool 2054 creates the logical printer of the aggregation target in the client terminal 103, it is possible to easily determine which one of the logical printers registered in the print system 20511 of the client terminal 103 is to be the base for creating the logical printer of the aggregation target. Further, in a case where the administrator designates a printer driver module name in the control 603 instead of designating the model name of a printer driver in the drop-down list 602, the logical printer of the aggregation target is created based on a logical printer including this printer driver module name. This printer driver module name refers to the file name of the rendering module 305 described with reference to FIG. 3, but is not limited thereto, and may be a module name included in a driver package for limiting printer models to be supported. These days, printer drivers are universalized, and different models use a common printer driver module in many cases. Therefore, the logical printer of the aggregation target can be determined not only by the model name of the printer driver but also by the driver module name, so that inconvenience of inputting the model names of all the printer drivers to be aggregation targets is eliminated, and the workload of a cloud print service administrator is thereby reduced.

Figure 7:
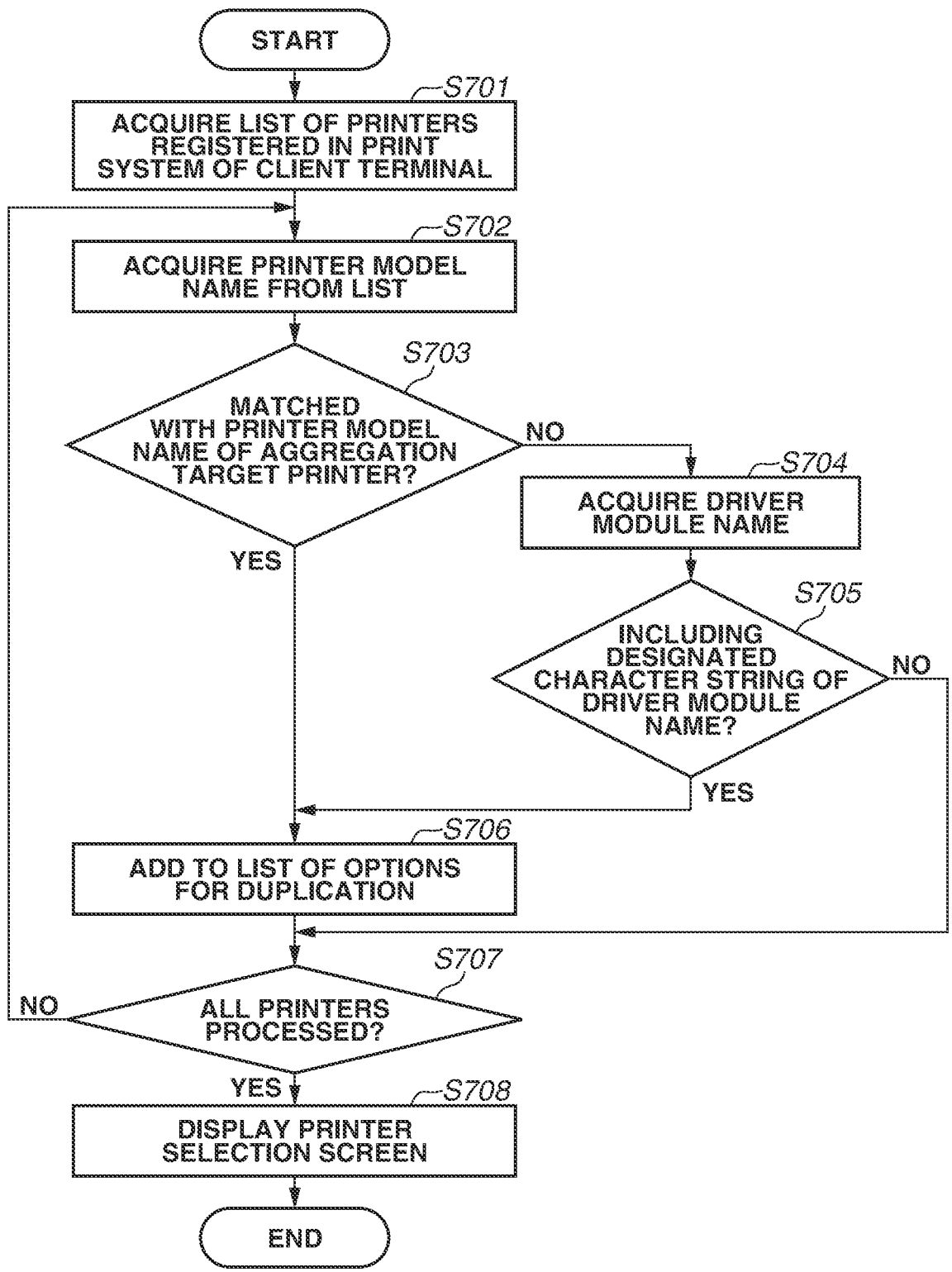
FIG. 7 illustrates a flowchart of processing for displaying a setup screen that displays a list of options for the aggregation target printer to prompt a user to make a selection in the present exemplary embodiment.

FIG. 7 is a flowchart illustrating processing of displaying a setup screen for displaying options for the logical printer of the aggregation target to prompt the user to make a selection, by executing the printer driver setup tool 2054 in the client terminal 103.

Figure 8:
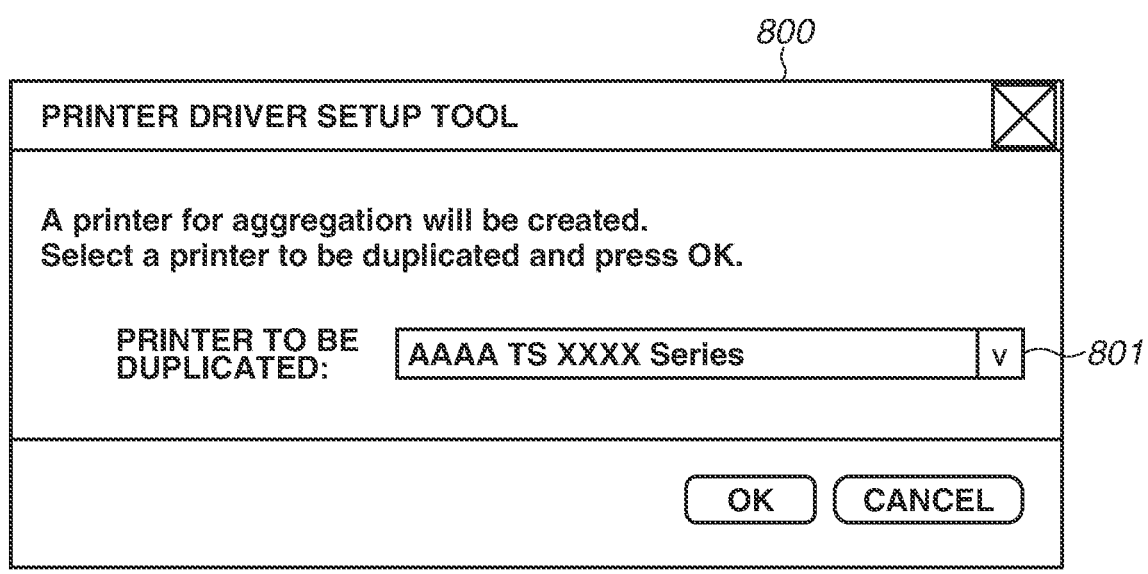
FIG. 8 illustrates an example of a selection screen for selecting the aggregation target printer in the present exemplary embodiment.

First, in step S701, the printer driver setup tool 2054 acquires a list of logical printers (print queues) registered in the print system 20511 of the client terminal 103. Next, in step S702, the printer driver setup tool 2054 acquires the printer model name from the printer information of one of the logical printers in the acquired list. In step S703, the printer driver setup tool 2054 examines whether the printer model name acquired in step S702 matches with any of the model names of the aggregation target printers (duplication source printer model names each designated in the drop-down list 602 in FIG. 6) acquired from the CPS 102. If the printer driver setup tool 2054 determines that the acquired printer model name matches with the model name of the aggregation target printer (YES in step S703), the processing proceeds to step S706. In step S706, the printer driver setup tool 2054 adds this logical printer to the list of options for the duplication. If the printer driver setup tool 2054 determines that the acquired printer model name does not match with the model name of the aggregation target printer (NO in step S703), the processing proceeds to step S704. In step S704, the printer driver setup tool 2054 acquires the driver module name from the printer information used in step S702. Subsequently, in step S705, the printer driver setup tool 2054 determines whether the acquired driver module name includes a character string (a character string designated in the control 603 in FIG. 6) representing "driver module name" acquired from the CPS 102. If the printer driver setup tool 2054 determines that the acquired driver module name includes the designated character string (YES in step S705), the processing proceeds to step S706. In step S706, the printer driver setup tool 2054 adds this logical printer to the list of options for the duplication. If the printer driver setup tool 2054 determines that the acquired driver module name does not include the designated character string (NO in step S705), the processing proceeds to step S707. In step S707, the printer driver setup tool 2054 determines whether all the logical printers in the list acquired in step S701 are processed. If the printer driver setup tool 2054 determines that there is a logical printer yet to be processed (NO in step S707), the processing returns to step S702 to repeat the above-described processing for the next printer information. If the printer driver setup tool 2054 determines that all the logical printers registered in the print system 20511 of the client terminal 103 are processed (YES in step S707), the processing proceeds to step S708. In step S708, the printer driver setup tool 2054 displays a selection screen for selecting the aggregation target printer in which the options are displayed in a drop-down list, as illustrated in FIG. 8. In FIG. 8, a selection screen 800 for selecting the aggregation target printer displays the printer names of the logical printers to be a duplication source in a drop-down list 801, so that the user of the client terminal 103 can provide an instruction to create a logical printer for work of the image forming apparatus 101 to be used for work.

Figure 9:
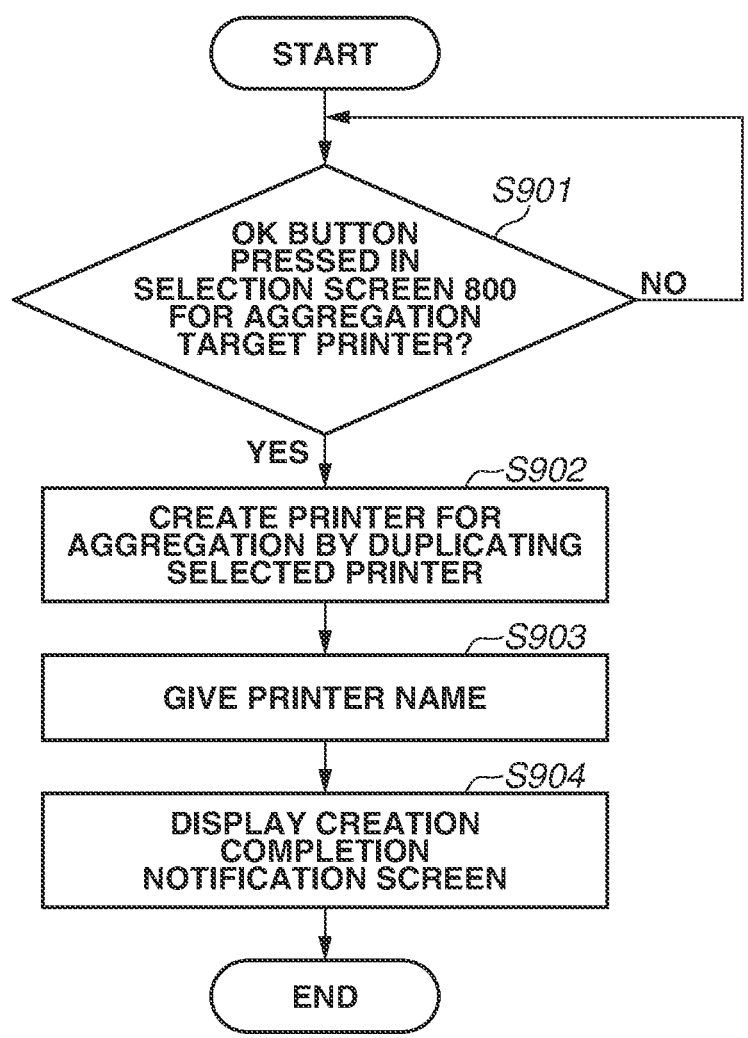
FIG. 9 illustrates a flowchart of processing for creating the aggregation target printer in the present exemplary embodiment.

FIG. 9 is a flowchart illustrating processing of creating the logical printer for work (the print queue for work) of the image forming apparatus 101 to be the aggregation target. The printer driver setup tool 2054 executes this processing.

Figure 10:
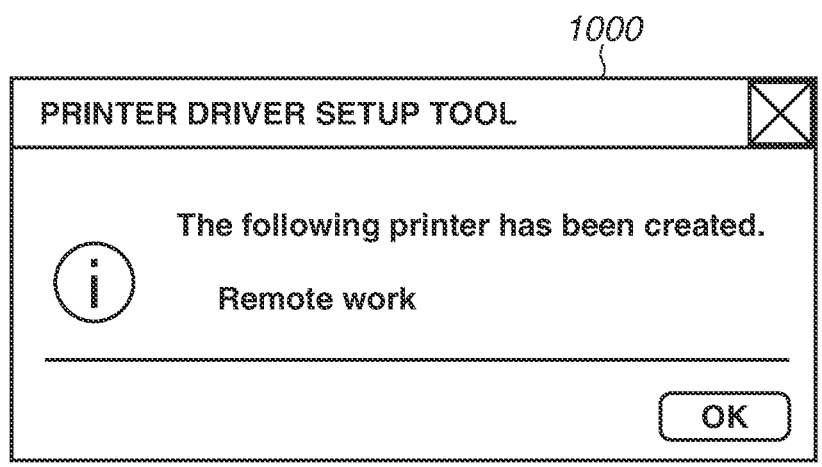
FIG. 10 illustrates an example of a screen for notifying the completion of the creation of the aggregation target printer in the present exemplary embodiment.

In step S901, the printer driver setup tool 2054 determines whether an OK button is pressed after a desired printer is selected by the user in the drop-down list 801 in the selection screen 800 for selecting the aggregation target printer in FIG. 8. If the OK button is pressed (YES in step S901), the processing proceeds to step S902. In step S902, the printer driver setup tool 2054 duplicates the selected logical printer, thereby creating the logical printer to be the aggregation target. Subsequently, in step S903, the printer driver setup tool 2054 gives a printer name (a printer name designated in the list 506 in FIG. 5) defined beforehand in the CPS 102, as the printer name of the created logical printer to be the aggregation target. In step S904, upon completion of the creation of the logical printer to be the aggregation target, the printer driver setup tool 2054 displays a creation completion notification screen 1000 for notifying the created printer name, as illustrated in FIG. 10. For example, in a case where the printer model named "AAAA TS XXXX Series" is selected in the drop-down list 801 in FIG. 8, a logical printer given the printer name "Remote Work" corresponding to the selected printer model is created, and the screen illustrated in FIG. 10 is displayed. The logical printer (the printer to be the aggregation target) thus created is displayed in the list 1201 as illustrated in FIG. 12 in printing using the print application 301, so that the user can select the created logical printer.

As described above, according to the present exemplary embodiment, the logical printer (the print queue) for work can be easily created from the printer (the print queue of the printer owned by the user) registered in the client terminal 103. Further, in a case where it may be desirable to perform printing for work during teleworking, the user only selects the logical printer for work and provides the print instruction, so that the information of the printing for work is automatically notified to the CPS 102.

In this way, the information about the print job generated in the print queue of the logical printer for work is acquired and transmitted, and the user uses the print queue for work and the print queue for private use separately, so that the information about printing performed for work can be easily transmitted to the external service.

Moreover, according to the present exemplary embodiment, unlike US2014/0067456, it is not necessary to prepare a new printer driver for displaying a button for a user to select whether printing is for private use or for public use in a print setting screen.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-188195, filed Nov. 11, 2020, which is hereby incorporated by reference herein in its entirety.

What is claimed is:

1. An information processing apparatus comprising:
at least one memory that stores instructions; and
at least one processor that executes the instructions to perform:
creating a logical printer for queuing print jobs in a predetermined print queue, by duplicating a logical printer registered in the information processing apparatus;
acquiring information about a print job queued in the predetermined print queue by the created logical printer; and
transmitting the acquired information about the print job to an external service to aggregate information about print jobs.

2. The information processing apparatus according to claim 1, wherein the predetermined print queue is a print queue of a logical printer given a predetermined printer name.

3. The information processing apparatus according to claim 2, wherein the predetermined printer name is a printer name designated by an administrator of the external service.

4. The information processing apparatus according to claim 2, wherein the predetermined printer name is a printer name identifiable by a user of the information processing apparatus, as being for work.

5. The information processing apparatus according to claim 1, wherein the created logical printer is created by duplicating a logical printer registered in the information processing apparatus and changing a printer name of the duplicated logical printer.

6. The information processing apparatus according to claim 5, wherein the at least one processor executes the instructions to further perform:
displaying at least either a logical printer of a predetermined printer model or a logical printer using a predetermined driver module, as an option, among a plurality of logical printers registered in the information processing apparatus; and
creating a logical printer for queuing print jobs in the predetermined print queue, by duplicating a logical printer selected by a user of the information processing apparatus from options each of which is the displayed option, and changing a printer name thereof.

7. The information processing apparatus according to claim 1, wherein the information about the print job is transmitted to the external service, each time the information about the print job is acquired.

8. The information processing apparatus according to claim 1, wherein the information about the print job is regularly transmitted to the external service.

9. The information processing apparatus according to claim 6, wherein at least one of the predetermined printer model and the predetermined driver module is set by an administrator of the external service.

10. An information processing method executed by an information processing apparatus, the information processing method comprising:
- creating a logical printer for queuing print jobs in a predetermined print queue, by duplicating a logical printer registered in the information processing apparatus;
- acquiring information about a print job queued in the predetermined print queue by the created logical printer; and
- transmitting the acquired information about the print job to an external service to aggregate information about print jobs.

11. A non-transitory computer readable storage medium storing a program for causing a processor of an information processing apparatus to perform:
- creating a logical printer for queuing print jobs in a predetermined print queue, by duplicating a logical printer registered in the information processing apparatus;
- acquiring information about a print job queued in the predetermined print queue by the created logical printer; and
- transmitting the acquired information about the print job to an external service to aggregate information about print jobs.

12. The non-transitory computer readable storage medium according to claim 11, wherein the predetermined print queue is a print queue of a logical printer given a predetermined printer name.

13. The non-transitory computer readable storage medium according to claim 12, wherein the predetermined printer name is a printer name designated by an administrator of the external service.

14. The non-transitory computer readable storage medium according to claim 12, wherein the predetermined printer name is a printer name identifiable by a user of the information processing apparatus, as being for work.

15. The non-transitory computer readable storage medium according to claim 11, wherein the created logical printer is created by duplicating a logical printer registered in the information processing apparatus and changing a printer name of the duplicated logical printer.

16. The non-transitory computer readable storage medium according to claim 15, wherein the program causes the processor to further perform:
- displaying at least either a logical printer of a predetermined printer model or a logical printer using a predetermined driver module, as an option, among a plurality of logical printers registered in the information processing apparatus; and
- creating a logical printer for queuing print jobs in the predetermined print queue, by duplicating a logical printer selected by a user of the information processing apparatus from options each of which is the displayed option, and changing a printer name thereof.

17. The non-transitory computer readable storage medium according to claim 11, wherein the information about the print job is transmitted to the external service, each time the information about the print job is acquired.

18. The non-transitory computer readable storage medium according to claim 11, wherein the information about the print job is regularly transmitted to the external service.

19. The non-transitory computer readable storage medium according to claim 16, wherein at least one of the predetermined printer model and the predetermined driver module is set by an administrator of the external service.

\* \* \* \* \*